US012303947B2

(12) United States Patent
Kim et al.

(10) Patent No.: US 12,303,947 B2
(45) Date of Patent: May 20, 2025

(54) APPARATUS FOR CLEANING MASK

(71) Applicant: Samsung Display Co., LTD., Yongin-si (KR)

(72) Inventors: Jai Phoong Kim, Yongin-si (KR); Jae Hoon Lee, Yongin-si (KR); Hyuk Kang, Yongin-si (KR); Chang Uk An, Yongin-si (KR); Han Geul Lim, Yongin-si (KR); Byung Jin Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 284 days.

(21) Appl. No.: 18/112,716

(22) Filed: Feb. 22, 2023

(65) Prior Publication Data

US 2023/0381832 A1 Nov. 30, 2023

(30) Foreign Application Priority Data

May 31, 2022 (KR) ........................ 10-2022-0066519

(51) Int. Cl.
*B08B 3/12* (2006.01)

(52) U.S. Cl.
CPC .......... *B08B 3/12* (2013.01); *B08B 2203/007* (2013.01)

(58) Field of Classification Search
CPC ........................................................ B08B 3/12
See application file for complete search history.

(56) References Cited

FOREIGN PATENT DOCUMENTS

| | | | |
|---|---|---|---|
| KR | 10-0757018 | 9/2007 | |
| KR | 10-2018-0068367 | 6/2018 | |
| KR | 10-2113564 | 5/2020 | |
| WO | WO2018236135 | * 12/2018 | ............ H01L 51/00 |

* cited by examiner

*Primary Examiner* — Jason Y Ko
(74) *Attorney, Agent, or Firm* — KILE PARK REED & HOUTTEMAN PLLC

(57) ABSTRACT

A mask cleaning apparatus includes a cleaning bath including an accommodating space in which a cleaning solution is stored, a transfer robot transferring a mask, and an induction heating member disposed inside the accommodating space. The cleaning bath includes at least one side and a bottom surface, which define the accommodating space. The induction heating member includes a first heating member, a second heating member, and a waterproof layer covering the first heating member and the second heating member.

20 Claims, 15 Drawing Sheets

APPARATUS FOR CLEANING MASK

CROSS-REFERENCE TO RELATED APPLICATION(S)

This application claims priority to and benefits of Korean Patent Application No. 10-2022-0066519 under 35 U.S.C. 119, filed on May 31, 2022, in the Korean Intellectual Property Office (KIPO), the entire contents of which are incorporated herein by reference.

BACKGROUND

1. Technical Field

The disclosure relates to a mask cleaning apparatus.

2. Description of the Related Art

A mask is used as a core part for forming a precise pattern on a substrate. In particular, in a process of manufacturing an electronic component device, a precisely patterned mask is brought very close to or brought into contact with the substrate, so that a mask may transfer a pattern shape to perform patterning on the substrate.

When a mask is reused, a cleaning process of the mask is required to form a precise pattern. Methods of cleaning a mask include a chemical wet cleaning method, a method using laser or ultrasonic waves, etc. However, it is not easy to clean a gap in the mask and a space between the mask and a frame coupled to the mask.

SUMMARY

An object of the disclosure is to provide a mask cleaning apparatus that effectively removes a solution remaining between mask sticks with a simple structure.

Another object of the disclosure is to provide a mask cleaning apparatus, in which a temperature of a mask is increased with a low power to efficiently heat the mask during a cleaning process of the mask.

The objects of the disclosure are not limited to those mentioned above and additional objects of the disclosure, which are not mentioned herein, will be clearly understood by those skilled in the art from the following description of the disclosure.

According to an embodiment of the disclosure, a mask cleaning apparatus may include a cleaning bath including an accommodating space in which a cleaning solution is stored, a transfer robot transferring a mask, and an induction heating member disposed inside the accommodating space. The cleaning bath may include at least one side and a bottom surface, which define the accommodating space. The induction heating member may include a first heating member, a second heating member, and a waterproof layer covering the first heating member and the second heating member.

A surface of the first heating member and a surface of the second heating member may face each other.

The at least one side of the cleaning bath may include a first side extending in a first direction, and a second side extending in a second direction intersecting the first direction in plan view. A length of the first side may be longer than a length of the second side in plan view.

Each of the surface of the first heating member and the surface of the second heating member may extend in the first direction in plan view.

The induction heating member may further include a third heating member and a fourth heating member, and each of a surface of the third heating member and a surface of the fourth heating member may extend in the second direction.

Each of the surface of the first heating member and the surface of the second heating member may extend in the second direction in plan view.

The mask cleaning apparatus may further include a coupling member disposed on the surface of the first heating member and the surface of the second heating member.

The first heating member and the second heating member may be spaced apart from the bottom surface of the cleaning bath.

Each of the first heating member and the second heating member may generate heat by an induced current flowing in a resistor inside each of the first heating member and the second heating member.

The mask cleaning apparatus may further include an ultrasonic generator disposed inside the cleaning bath. The ultrasonic wave generator may generate ultrasonic waves.

The ultrasonic wave generator may be disposed between the first heating member and the second heating member in plan view.

The ultrasonic wave generator may be disposed at a center of the cleaning bath in plan view.

The transfer robot may include a robot hand, and the robot hand may be coupled with the mask to transfer the mask to the accommodating space of the cleaning bath, or transfer the mask from the accommodating space to outside of the cleaning bath.

The induction heating member may be supplied with power to apply heat to the mask disposed in the accommodating space of the cleaning bath.

According to an embodiment of the disclosure, a mask cleaning apparatus may include a cleaning bath including an accommodating space in which a cleaning solution is stored, an ultrasonic wave generator disposed inside the cleaning bath and generating ultrasonic waves, and a transfer robot including an induction heating member. The transfer robot may transfer a mask to the accommodating space of the cleaning bath, or transfers the mask from the accommodating space to outside of the cleaning bath.

The transfer robot may further include a robot arm to which the induction heating member is coupled, and a robot hand coupled to the mask during a transfer process.

The induction heating member and the robot hand may be disposed on a same side of the robot arm.

A shortest distance between the robot arm and the induction heating member and a shortest distance between the robot arm and the robot hand may be same.

The induction heating member may be coupled to the mask to directly grip the mask during a transfer process.

The induction heating member may include a first heating member and a second heating member, and the mask may be disposed between the first heating member and the second heating member during the transfer process of the mask.

According to the mask cleaning apparatus, it is possible to improve cleaning efficiency and readily clean a space between mask sticks by efficiently heating the mask with a low power in a short time. Also, a cleaning power by ultrasonic waves may be improved due to the influence of the temperature increase, so that the cleaning power of the mask cleaning apparatus may be enhanced.

The effects according to the embodiments of the disclosure are not limited to those mentioned above and more various effects are included in the following description of the disclosure.

Other features and embodiments may be apparent from the following detailed description, the drawings, and the claims.

BRIEF DESCRIPTION OF THE DRAWINGS

The accompanying drawings, which are included to provide a further understanding of the disclosure, illustrate embodiments in which.

DETAILED DESCRIPTION OF THE EMBODIMENTS

The embodiments will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification. In the attached figures, the thickness of layers and regions is exaggerated for clarity.

When an element, such as a layer, is referred to as being “on”, “connected to”, or “coupled to” another element or layer, it may be directly on, connected to, or coupled to the other element or layer or intervening elements or layers may be present. When, however, an element or layer is referred to as being “directly on”, “directly connected to”, or “directly coupled to” another element or layer, there are no intervening elements or layers present. To this end, the term “connected” may refer to physical, electrical, and/or fluid connection, with or without intervening elements. Also, when an element is referred to as being “in contact” or “contacted” or the like to another element, the element may be in “electrical contact” or in “physical contact” with another element; or in “indirect contact” or in “direct contact” with another element.

It will be understood that, although the terms “first,” “second,” “third,” or the like may be used herein to describe various elements, these elements should not be limited by these terms. These terms are used to distinguish one element from another element or for the convenience of description and explanation thereof. For example, when “a first element” is discussed in the description, it may be termed “a second element” or “a third element,” and “a second element” and “a third element” may be termed in a similar manner without departing from the teachings herein.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, detailed embodiments will be described with reference to the accompanying drawings.

Figure 1:
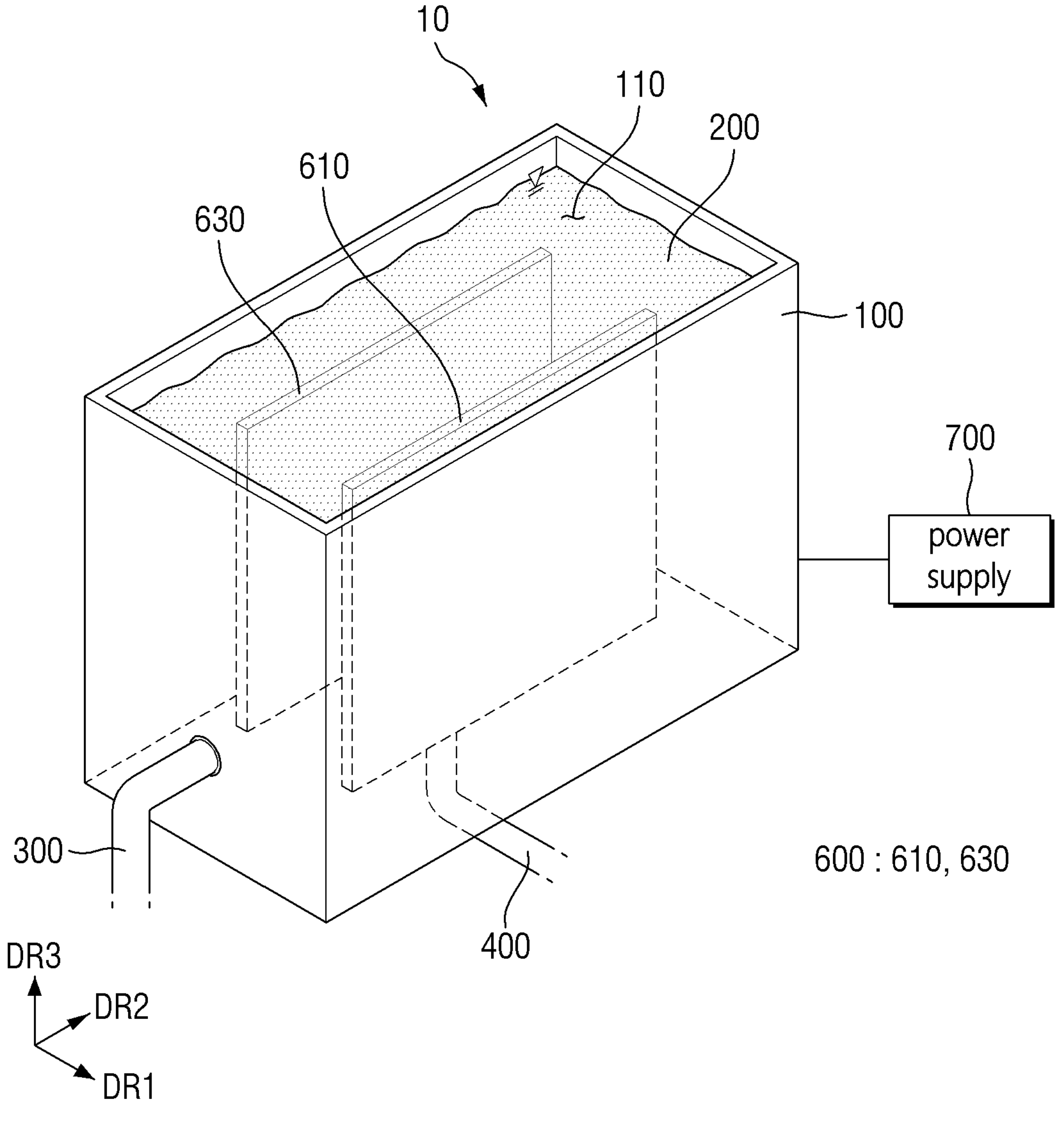
FIG. 1 is a perspective view illustrating a mask cleaning apparatus according to one embodiment.

FIG. 1 is a perspective view illustrating a mask cleaning apparatus according to one embodiment.

Referring to FIG. 1, a mask cleaning apparatus 10 may include a cleaning bath 100, a supply pipe 300, a discharge pipe 400, and an induction heating device 600. For example, the mask cleaning apparatus 10 may include a cleaning bath 100 in which a cleaning solution 200 is stored, a supply pipe 300 supplying the cleaning solution 200 into the cleaning bath 100, a discharge pipe 400 discharging the cleaning solution 200 from the cleaning bath 100, and an induction heating device 600 disposed inside the cleaning bath 100.

The cleaning bath 100 may have a rectangular parallelepiped shape with an empty inside. For example, the cleaning bath 100 may have a cylindrical shaped structure having an external appearance of a rectangular parallelepiped shape comprised of edges (at least one side and/or a bottom surface) parallel with a first direction DR1, a second direction DR2, and a third direction DR3, and having an outer wall of a predetermined (or selectable) thickness. In other words, the cleaning bath 100 may have a rectangular cylindrical shape. An edge (or a side) of the cleaning bath 100 in the first direction DR1 may be shorter than an edge (or a side) of the cleaning bath 100 in the second direction DR2. Therefore, a mask 810 (shown in FIG. 7) that is a cleaning target of the mask cleaning apparatus 10 may be disposed inside the cleaning bath 100 so as to be parallel with a surface formed by the second direction and the third direction during a cleaning process.

The cleaning bath 100 is shown as a rectangular cylindrical shape in FIG. 1, but is not limited thereto. For example, the cleaning bath 100 may have various shapes such as a cylindrical shape, a pentagonal cylindrical shape, etc. However, for convenience of description, the description will be based on that the cleaning bath 100 has a rectangular cylindrical shape as shown.

A side of the cleaning bath 100 may be connected to the supply pipe 300, and a lower surface of the cleaning bath 100 may be connected to the discharge pipe 400. A portion where the cleaning bath 100 are connected to the supply pipe 300 and the discharge pipe 400 may be penetrated, and may include various switching structures. Although a side of the cleaning bath 100 in an opposite direction of the second direction is shown as being connected to the supply pipe 300 and a lower surface of the cleaning bath 100 is shown as being connected to the discharge pipe 400, the disclosure is not limited thereto. For example, the supply pipe 300 and the discharge pipe 400 may be connected to the same side of the cleaning bath 100, or may have various arrangements.

The induction heating device (or induction heating member) 600 may be disposed inside the cleaning bath 100. A side of the cleaning bath 100 in the first direction is defined as a first side, a side of the cleaning bath 100 in the second direction is defined as a second side, a side of the cleaning bath 100 in an opposite direction of the first direction is defined as a third side, and a side of the cleaning bath 100 in an opposite direction of the second direction is defined as a fourth side. For example, the first side, the second side, the third side and the fourth side may be arranged in a counterclockwise direction in a plan view.

The mask cleaning apparatus 10 may include a power supply 700. The power supply 700 may supply power to the induction heating device 600. The induction heating device 600 may be turned on or turned off by power supply of the power supply 700.

The induction heating device 600 may be configured by installing a heating coil (or a resistor), which operates using high frequency electric energy as power, in a water tank. The induction heating device 600 may amplify the electric energy to a high frequency to supply the amplified high frequency electric energy to the heating coil, and the heating coil may be heated with the supplied high frequency power to heat a surrounding target. The induction heating uses an electromagnetic induction, and in case that a high frequency induced current flows in the coil, a high frequency magnetic field is generated around a conductor. Since the high frequency magnetic field changes the intensity of the magnetic field in response to a change in the intensity and direction of the current, the change of the magnetic field generates an induced current in the conductor and Joule heating occurs due to resistance of the conductor, whereby the coil generates heat.

Since the induced current is proportional to the square of the frequency, heat may be generated within a very short time, and fast high-temperature heating may be achieved with a minimum power in case that a high frequency current is used.

Figure 2:
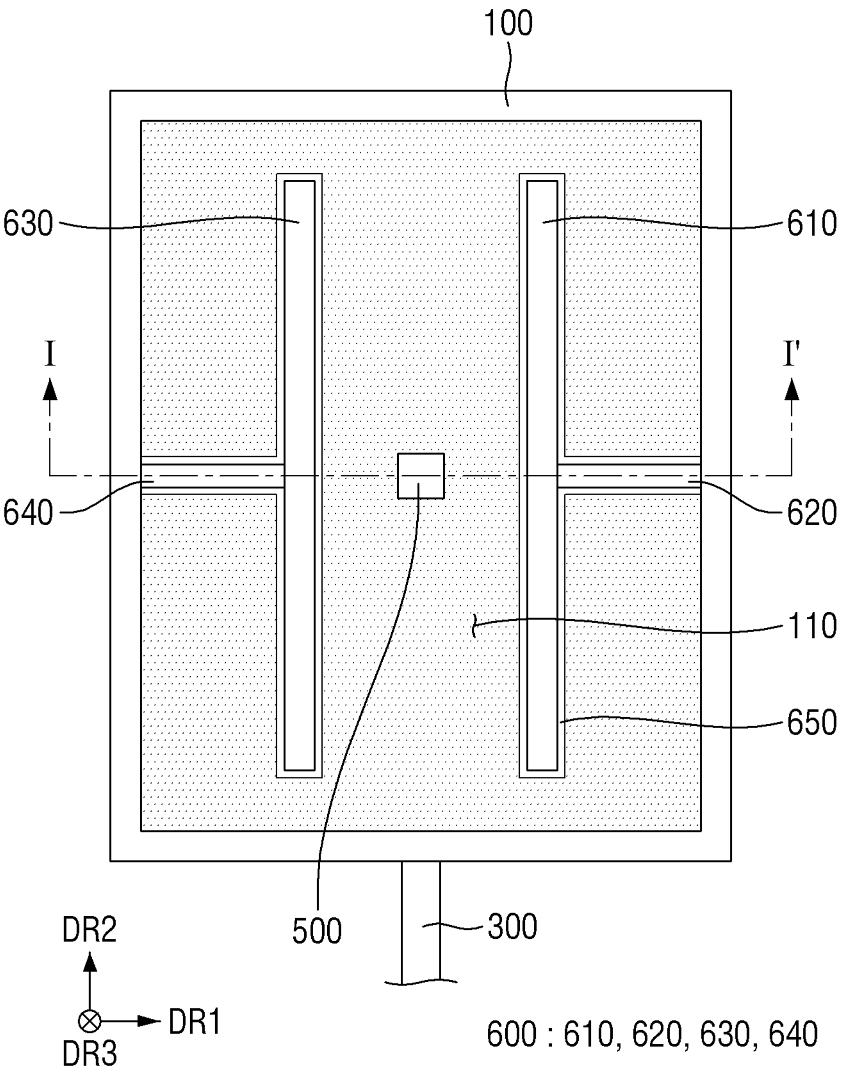
FIG. 2 is a plan view illustrating a mask cleaning apparatus according to one embodiment.
Figure 3:
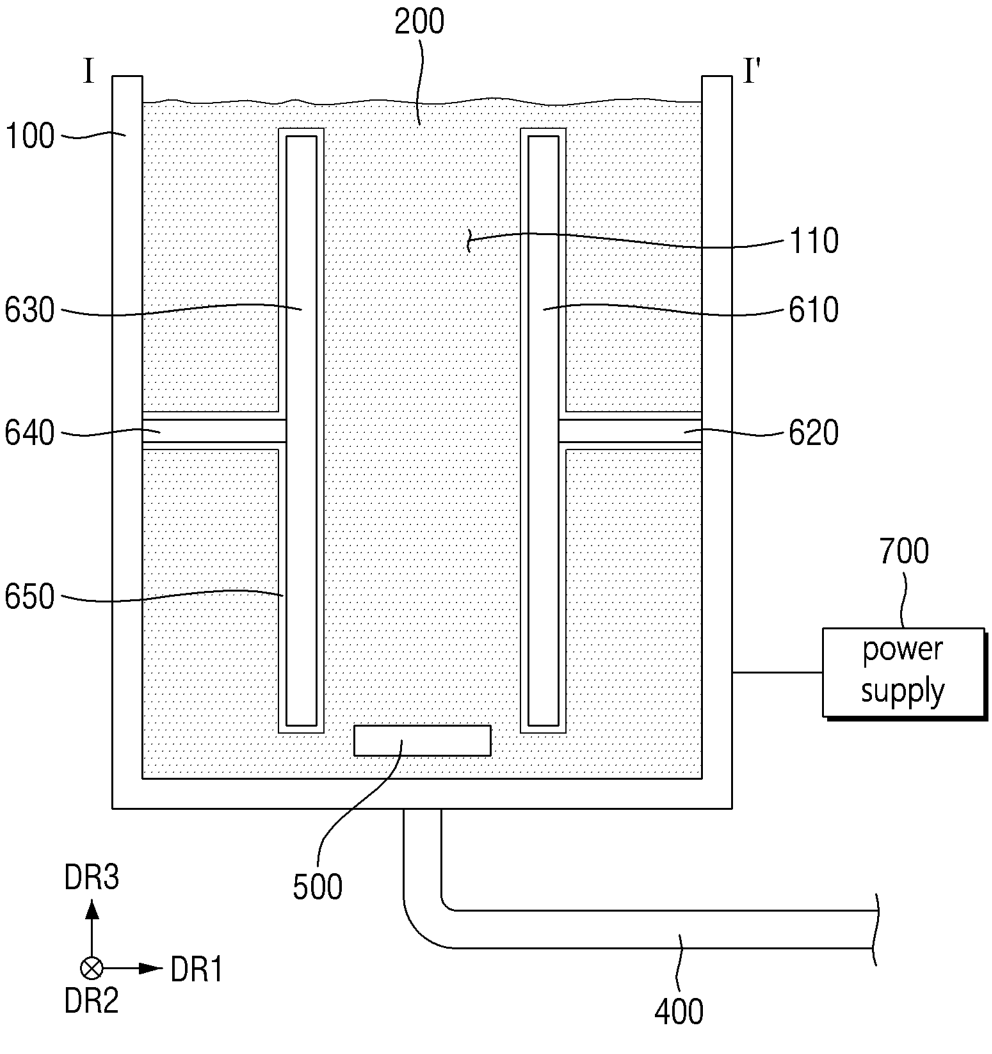
FIG. 3 is a schematic cross-sectional view taken along line I-I' of FIG. 2.

FIG. 2 is a plan view illustrating a mask cleaning apparatus according to one embodiment. FIG. 3 is a schematic cross-sectional view taken along line I-I' of FIG. 2.

Referring to FIGS. 2 and 3, the induction heating device 600 may include a first heating coil 610, a first support 620, a second heating coil 630, and a second support 640. The first heating coil 610 and the second heating coil 630 may be configured to generate heat in the induction heating device 600. The first heating coil 610 may be disposed to be parallel with the first side of the cleaning bath 100, and the second heating coil 630 may be disposed to be parallel with the third side of the cleaning bath 100. The first support 620 may connect the first side with the first heating coil 610 to fix the first heating coil 610 inside the cleaning bath 100. The second support 640 may connect the third side with the second heating coil 630 to fix the second heating coil 630 inside the cleaning bath 100. The first heating coil 610 and the second heating coil 630 may be disposed in parallel. Therefore, in the cleaning process of the mask 810, heat may be uniformly applied to the mask 810 and the frame 820, which are disposed between the first heating coil 610 and the second heating coil 630.

Each of the first heating coil 610 and the second heating coil 630 may be supplied with power from the power supply 700 through conducting wires connected to the inside of the first and second supports 620 and 640. The first heating coil 610 and the second heating coil 630 may be turned on and off in accordance with the control of the power supply 700. In other words, in case that the first heating coil 610 and the second heating coil 630 are turned on, the first heating coil 610 and the second heating coil 630 may generate heat, whereby heat may be applied to a target disposed between the first heating coil 610 and the second heating coil 630. In the cleaning process of the mask 810, the mask 810 and the frame 820 may be disposed between the first heating coil 610 and the second heating coil 630, and the first heating coil 610 and the second heating coil 630 may be disposed adjacent to the mask 810 and the frame 820.

The amount of heat transferred to the heating target may be adjusted in accordance with the heating amount of the heating coil and the distance between the heating target and the heating coil. Therefore, in case that the mask 810 and the frame 820 are heated, the amount of heat transferred to the mask 810 and the frame 820 may be controlled by individually adjusting the heating amount of the first heating coil 610 disposed to be adjacent to the mask 810 and the heating amount of the second heating coil 630 disposed to be adjacent to the frame 820, or adjusting the distance between the mask 810 and the first heating coil 610 and the distance between the frame 820 and the second heating coil 630. In some embodiments, since the frame 820 is thicker than the mask 810 and requires more heat, the amount of heat transferred to the frame 820 may be greater than the amount of heat transferred to the mask 810 by allowing the heating amount of the second heating coil 630 to be greater than the heating amount of the first heating coil 610, or by allowing the distance between the second heating coil 630 and the frame 820 to be narrower than the distance between the first heating coil 610 and the mask 810.

A waterproof layer 650 may cover the first heating coil 610 and the second heating coil 630. The waterproof layer 650 may be directly in contact with the first heating coil 610 and the second heating coil 630 to prevent the cleaning solution 200 disposed inside the cleaning bath 100 of the mask cleaning apparatus from flowing into the first heating coil 610 and the second heating coil 630. For example, the waterproof layer 650 may be disposed between the first and second heating coils 610 and 630 and the cleaning solution 200. The waterproof layer 650 may include various waterproof materials having a waterproof function.

An ultrasonic wave generator 500 may be disposed on a lower surface of the cleaning bath 100. The ultrasonic wave generator 500 may be disposed between the first heating coil 610 and the second heating coil 630 in a plan view, but is not limited thereto. For example, the ultrasonic wave generator 500 may be disposed at various positions in contact with the cleaning solution 200 on the inner side of the cleaning bath 100.

The ultrasonic wave generator 500 may be vibrated to vibrate the cleaning solution 200 inside the cleaning bath 100. Therefore, particles deposited on the mask 810 may be effectively cleaned in the cleaning process of the mask 810. The detailed configuration and operation description of the cleaning operation using ultrasonic waves will be omitted.

Figure 4:
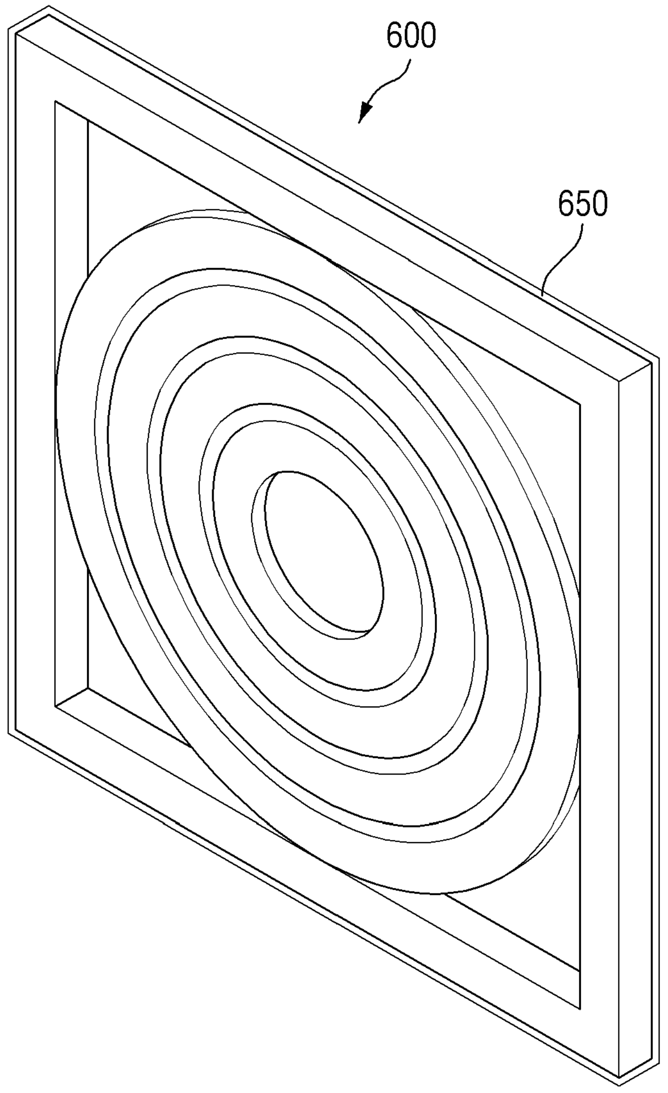
FIG. 4 is a schematic view illustrating an induction heating device of a mask cleaning apparatus according to one embodiment.

FIG. 4 is a schematic view illustrating an induction heating device of a mask cleaning apparatus according to one embodiment.

Referring to FIG. 4, the induction heating device 600 may include a coil portion and a waterproof layer 650. For example, the coil portion may be disposed at a center portion of the induction heating device 600, and the waterproof layer 650 may be disposed near the coil portion so that the waterproof layer 650 covers the coil portion. In case that power is applied to the coil portion, an induced magnetic field may be generated by electromagnetic induction, whereby Joule heat is generated. Therefore, the mask 810 and the frame 820 disposed in an accommodating space 110 of the mask cleaning apparatus 10 may be heated by Joule heat.

The waterproof layer 650 may cover the coil portion to form a waterproof structure. For example, an outer surface of the coil portion may be covered with the waterproof layer 650 to prevent the cleaning solution 200 disposed inside the cleaning bath 100 of the mask cleaning apparatus 10 from flowing into the induction heating device 600. In other words, the cleaning solution 200 may be prevented from flowing into the induction heating device 600 so as not to contact the coil portion or generate short circuit.

Figure 5:
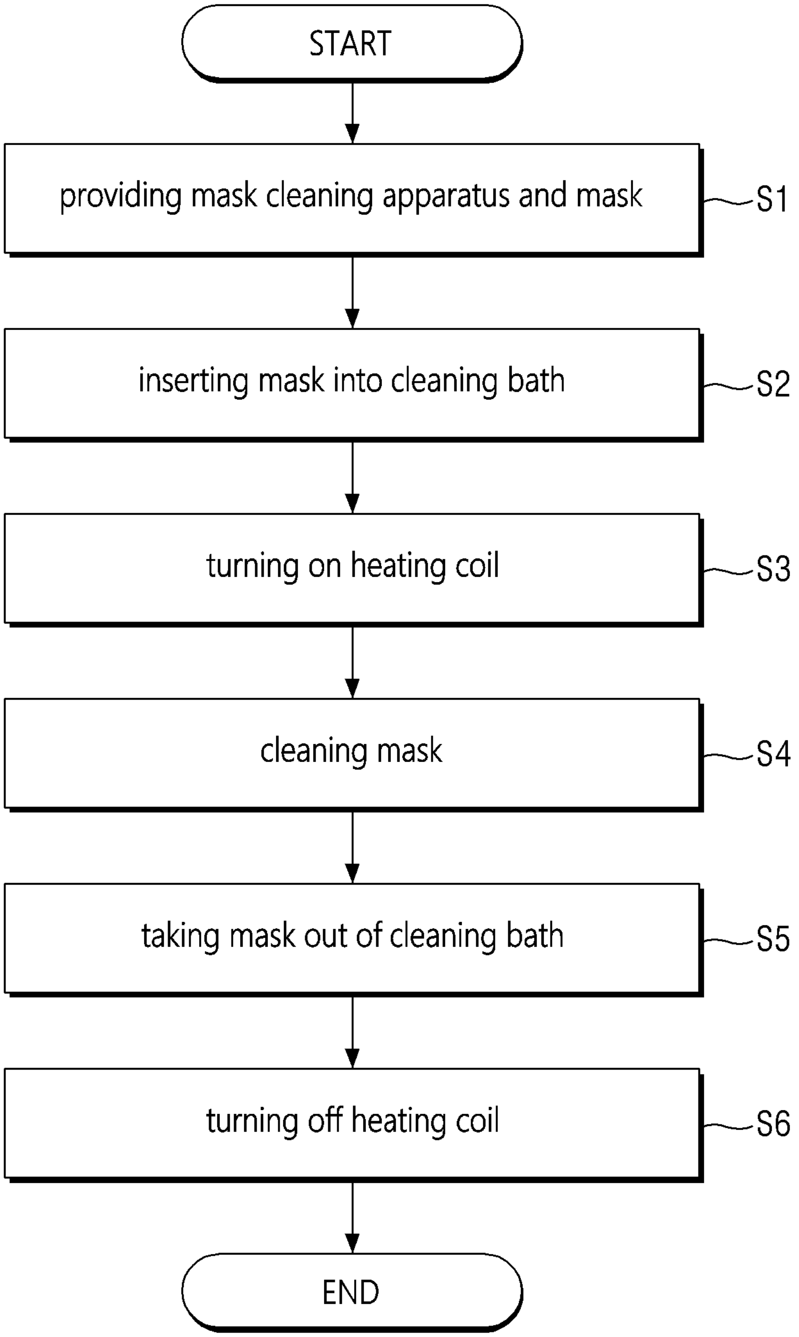
FIG. 5 is a flow chart illustrating a method of cleaning a mask.

FIG. 5 is a flow chart illustrating a method of cleaning a mask.

Referring to FIG. 5, a method of cleaning a mask 810 may include providing a mask cleaning apparatus 10 and a mask 810, inserting the mask 810 into a cleaning bath 100, turning on a heating coil, cleaning the mask 810, taking the mask 810 out of the cleaning bath 100, and turning off the heating coil.

FIGS. 6 to 11 are schematic cross-sectional views illustrating process steps of a method of cleaning a mask according to one embodiment.

Hereinafter, the method of cleaning the mask 810 will be described in more detail in conjunction with the flow chart of FIG. 5 and the drawings in FIGS. 6 to 11.

Figure 6:
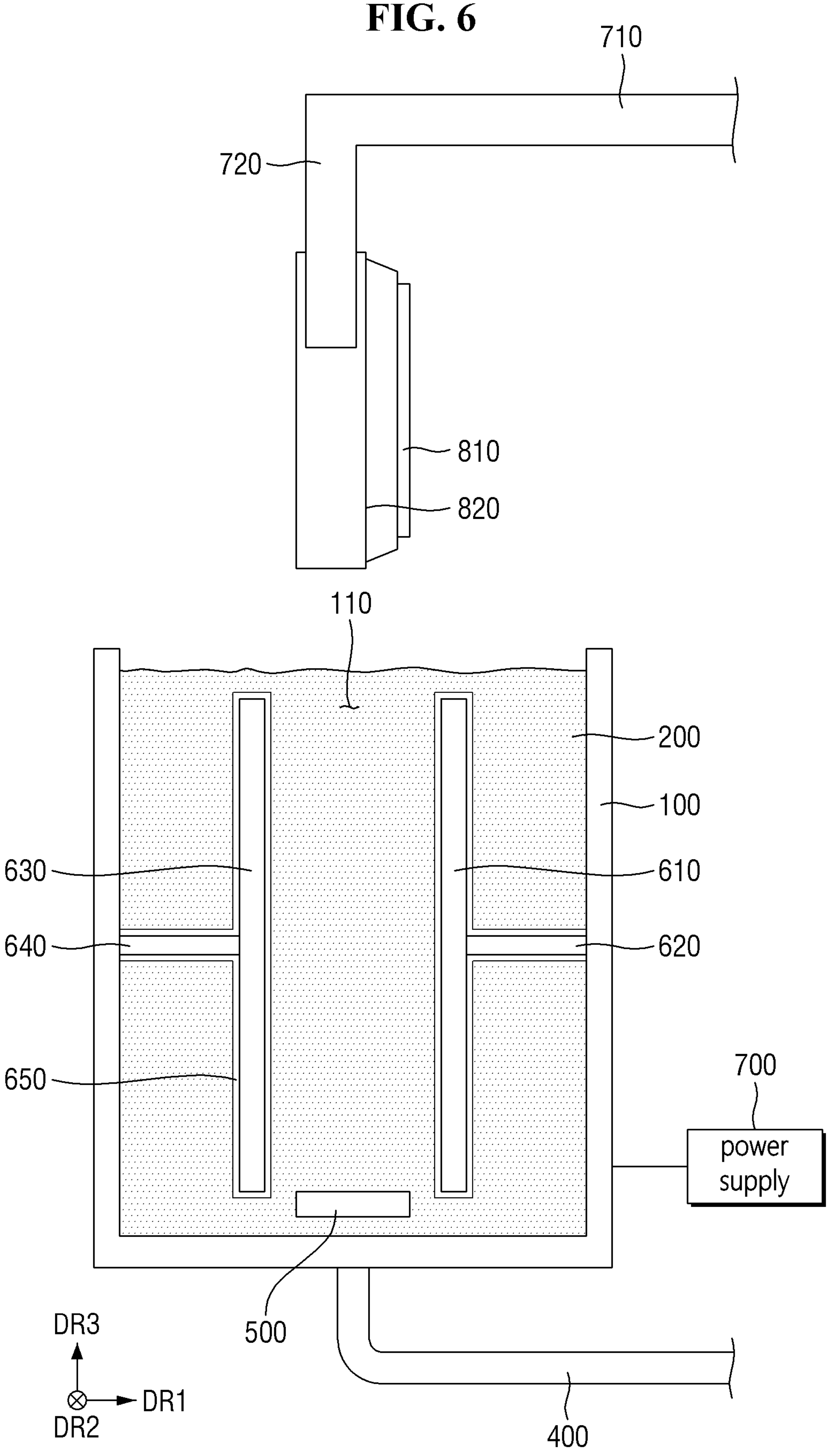
FIGS. 6 to 11 are schematic cross-sectional views illustrating process steps of a method of cleaning a mask according to one embodiment.

Referring to FIG. 6, the step of providing the mask cleaning apparatus 10 and the mask 810 may include a step of preparing the mask cleaning apparatus 10 and the mask 810 to be cleaned. The mask cleaning apparatus 10 may be the same as the mask cleaning apparatus 10 illustrated in FIGS. 1 to 4.

The mask 810 may be a fine metal mask 810 (FMM). In the manufacturing process of an OLED device, an organic light emitting layer manufactured by depositing an organic multi-layered film on a transparent insulating substrate may be formed as follows. For example, the organic light emitting layer may be formed by selectively supplying an organic light emitting material emitting a predetermined (or selectable) color from a supplier, which includes the organic light emitting material emitting the color, to a subpixel area through an opening of the mask 810 of a fine metal. The organic light emitting layer may be formed by evaporation, and the organic light emitting material may be supplied at a vaporized state so that the organic light emitting material is deposited on the exposed substrate. In case that an organic light emitting layer, which emits R, G and B colors, respectively, is provided in an organic electroluminescent element to be formed, a separate supplier with a corresponding color may be provided, whereby a process of forming the organic light emitting layer is performed for each color. The fine metal mask 810 may have a structure in which slots of a pattern for forming multiple organic layers or electrodes are formed on a thin plate for manufacturing an OLED device. The fine metal mask 810 may be coupled to the frame 820 to prevent a central portion of the fine metal mask 810 from sagging. For example, various organic materials may be deposited on the mask 810 used for the process of forming the organic light emitting layer and the frame 820 for maintaining the shape of the mask 810, and cleaning of the organic materials deposited on the mask 810 may be required for a precise process. In other words, the mask 810 provided in the cleaning process may be the mask 810 after being used in the process of forming the organic light emitting layer.

The mask 810 may move by being gripped by a robot hand 720 coupled to a robot arm 710. The robot arm 710 and the robot hand 720 may be any robot arms 710 and robot hands 720 that transfer a process target such as the mask 810.

Figure 7:
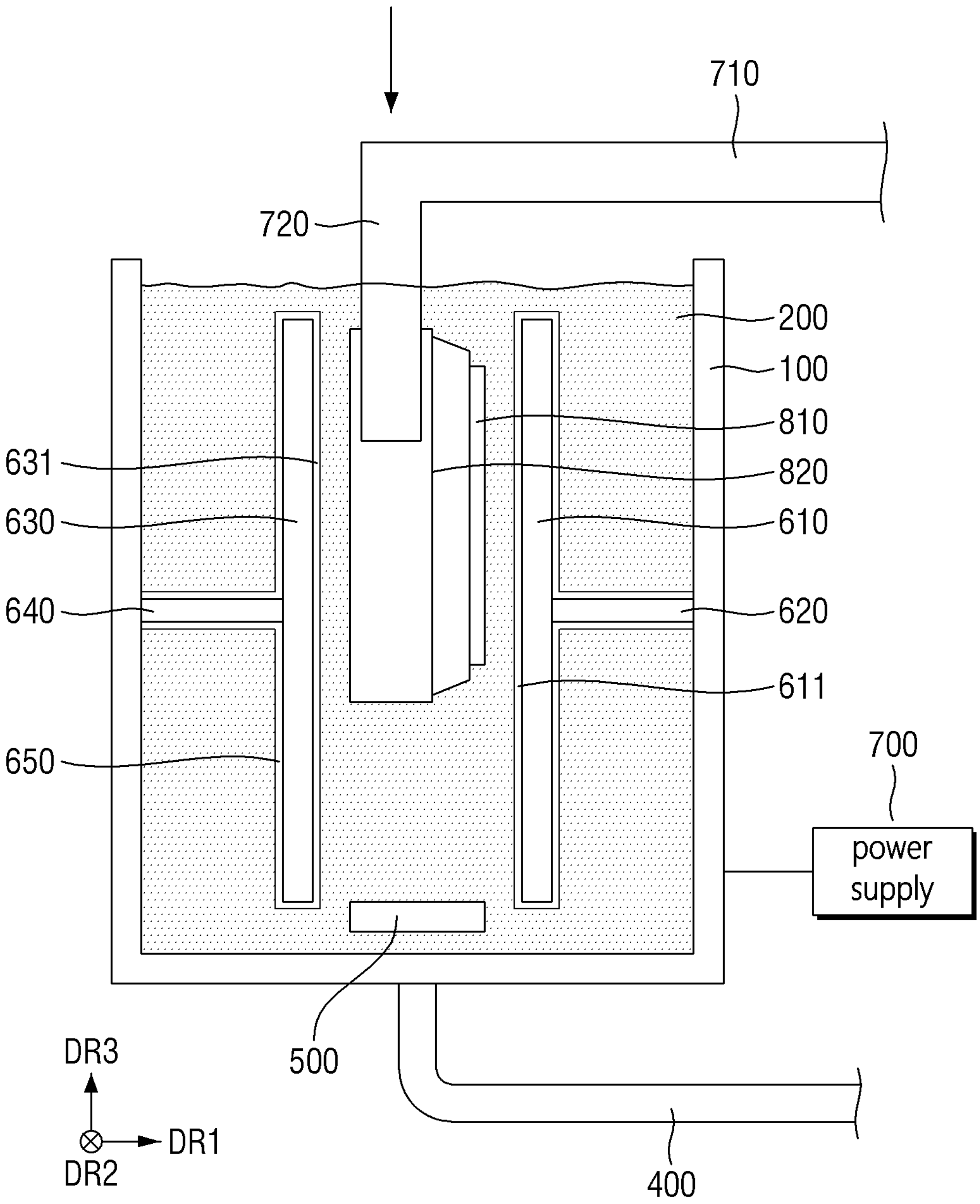

Referring to FIG. 7, the step of inserting the mask 810 into the cleaning bath 100 may include a step in which the robot hand 720 transfers the mask 810 and the frame 820 into the mask cleaning apparatus 10. The robot hand 720 may grip the frame 820 to move the mask 810. The robot hand 720 may be coupled to the frame 820 in contact with the frame 820 coupled to the mask 810, whereby the mask 810 and the frame 820 may move together without damaging the mask 810.

The mask 810 and frame 820 may be moved into the cleaning bath 100. In more detail, the mask 810 and the frame 820 may be disposed between the first heating coil 610 and the second heating coil 630 inside the cleaning bath 100. A surface where the mask 810 and the frame 820 are in contact each other may be defined as a rear surface of the mask 810 and a rear surface of the frame 820, and opposite surfaces of the rear surface of the mask 810 and the rear surface of the frame 820 may be respectively defined as one surface of the mask 810 and one surface of the frame 820.

One surface of the mask 810 may be disposed to be in parallel with one surface 611 of the first heating coil 610, and one surface of the frame 820 may be disposed to be in parallel with one surface 631 of the second heating coil 630. Therefore, a distance from one surface of the mask 810 to the first heating coil 610 in the first direction DR1 may be constant, and the distance from one surface of the frame 820 to the second heating coil 630 in the first direction DR1 may be constant.

The mask 810 and the frame 820 may be disposed inside the cleaning bath 100, and the mask 810 and the frame 820 may be sufficiently submerged in the cleaning solution 200 disposed in the cleaning bath 100. The cleaning solution 200 may be a chemical solution. The cleaning solution 200 may include $H_2O_2$, $NH_4OH$, or HCl. Dipping type cleaning may be performed by submerging the mask 810 and the frame 820 in the cleaning bath 100.

Figure 8:
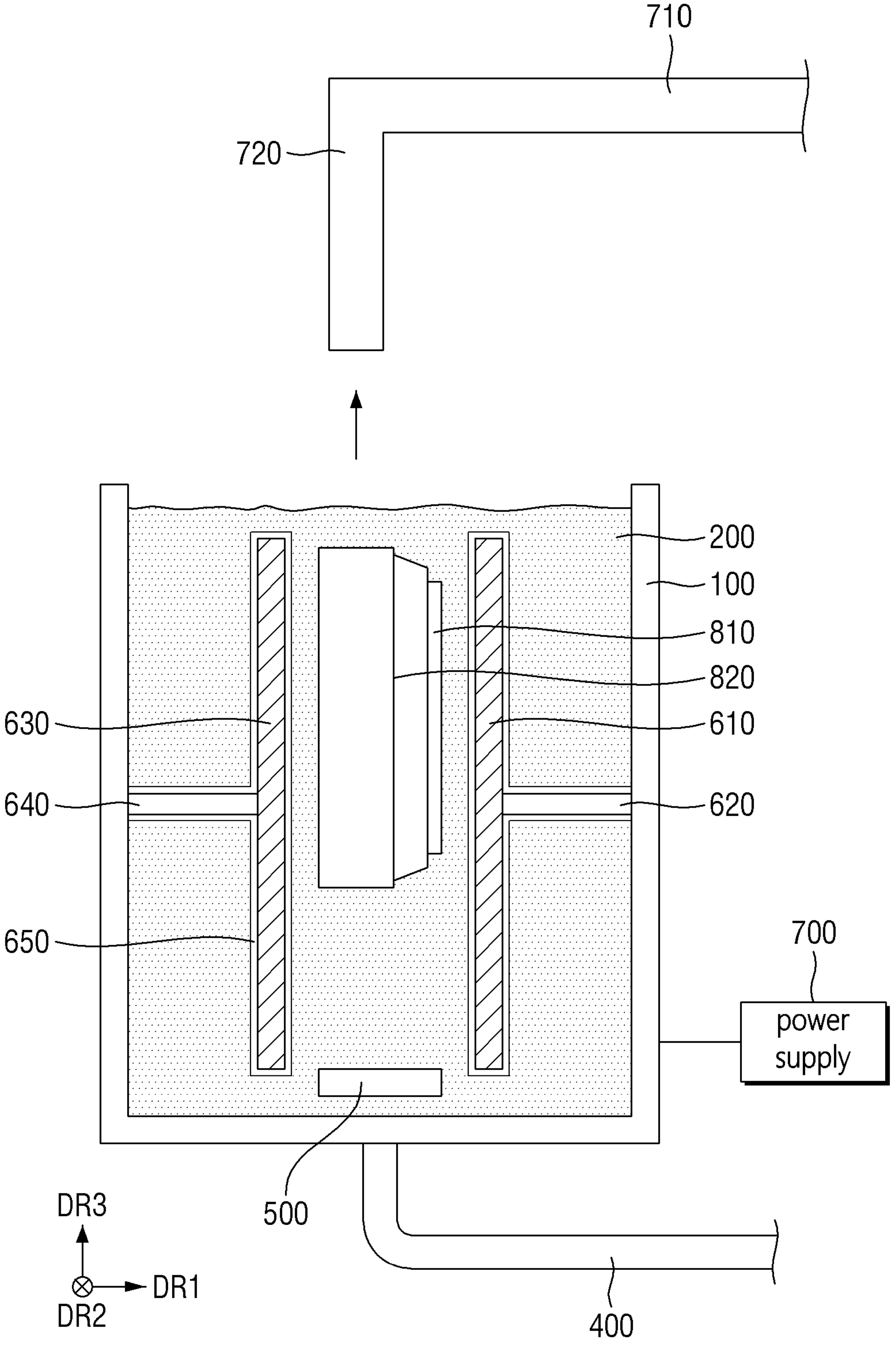

Referring to FIG. 8, the step of turning on the heating coil may include a step of separating the robot hand 720 from the frame 820 and supplying power to the induction heating device 600 by the power supply 700.

The power supply 700 may supply power to the first heating coil 610 and the second heating coil 630. The power supply 700 may be connected to the cleaning bath 100, may supply the power to the first heating coil 610 through the first support 620 connecting the cleaning bath 100 with the first heating coil 610, and may supply the power to the second heating coil 630 through the second support 640 connecting the cleaning bath 100 with the second heating coil 630. In response to the supply of the power, the first heating coil 610 and the second heating coil 630 may be turned on to generate heat. The first and second heating coils 610 and 630 are described as being turned on by the supply of the power supply 700, but are not limited thereto. For example, the power supply 700 may be always ready to supply the power to the first heating coil 610 and the second heating coil 630, and may turn on/off of the first heating coil 610 and the second heating coil 630 by a separate switch or the like.

The first heating coil 610 may apply heat in the opposite direction of the first direction, and the second heating coil 630 may apply heat in the first direction. Therefore, one surface of the mask 810 may be heated by the first heating coil 610, and one surface of the frame 820 may be heated by the second heating coil 630.

As described above, the heating method by the induction heating device 600 may perform in a smaller space than heating by a hot water supply device, may require less power, and may reach a set temperature in a short time, thereby increasing process efficiency. For example, the mask cleaning apparatus 10 including the induction heating device 600 may perform efficient heating with less power. Heat may be effectively transferred between the mask 810 and the frame 820 and between gaps of the mask 810 compared to the hot water supply device. In other words, the heating method by the induction heating device 600 may consume less power than that of the hot water supply device, and may directly heat the mask 810 and the frame 820 to increase a temperature of the mask 810 and the frame 820 together with a temperature of a peripheral unit, thereby increasing a cleaning power.

Figure 9:
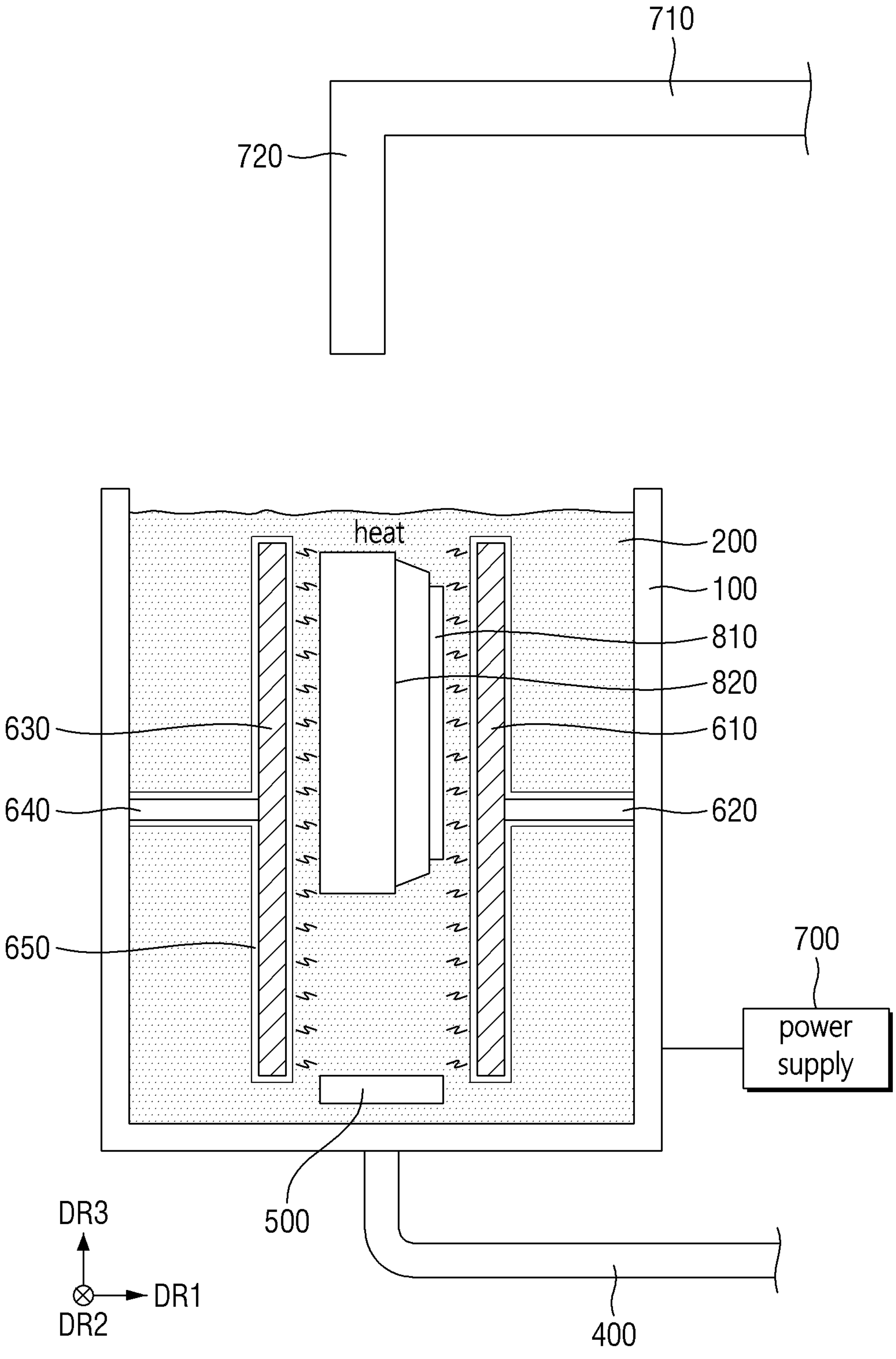

Referring to FIG. 9, the step of cleaning the mask 810 may include a step in which the cleaning solution 200 cleans the mask 810 and the frame 820.

The cleaning solution 200 may be permeated between surfaces of the mask 810 and the frame 820 and connection portions to clean the mask 810 and the frame 820. In case that the mask 810 and the frame 820 are heated, the mask 810 and the frame 820 may be thermally expanded to increase a space between the connection portions of the respective components of the mask 810 and the frame 820. Therefore, the cleaning solution 200 may be sufficiently permeated into the connection portions so that the connection portions may be sufficiently cleaned. In case that the space between the connection portions is increased, the ultrasonic wave generated by the ultrasonic wave generator 500 may sufficiently affect the connection portions of which space is increased. As the temperature is increased, the amount of molecular activity by ultrasonic waves may be increased, whereby dissolution of the organic material deposited on the mask 810 may be promoted. Therefore, efficiency of the ultrasonic wave generator 500 may be increased to increase performance of the mask cleaning apparatus 10.

The mask 810 may have a structure in which multiple sticks of the mask 810 are coupled to the frame 820. Therefore, the connection portion may include a space between the sticks of the mask 810. The space between the sticks of the mask 810 may be widened by heating the induction heating device 600, and a problem in which the solution remains between sticks of the mask 810 in the dipping type cleaning process may be solved. For example, as the space between the sticks of the mask 810 is widened, a surface area in which the solution remaining in contact with air may be increased, and surface tension may be reduced, so that the residual solution may be effectively removed.

Figure 10:
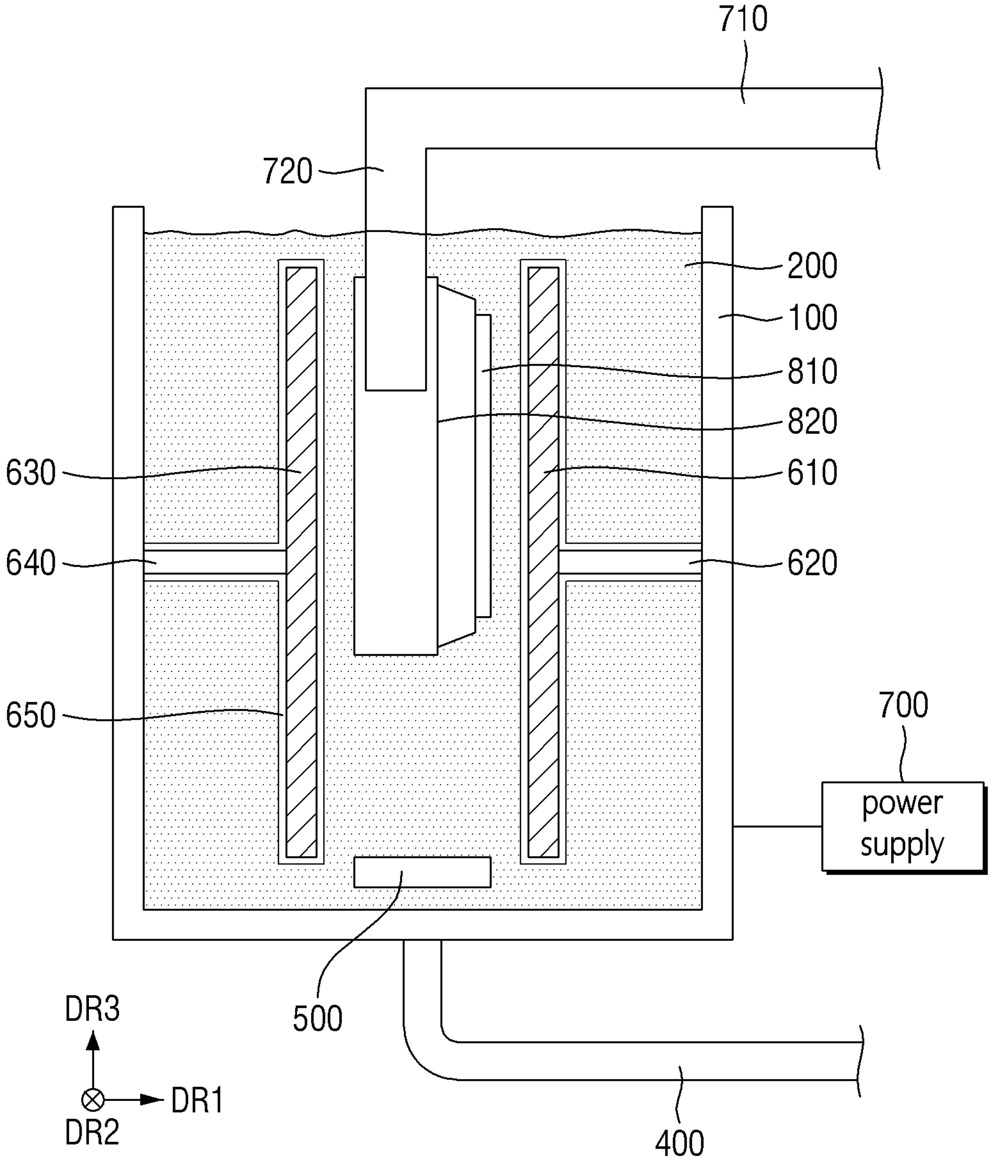
Figure 11:
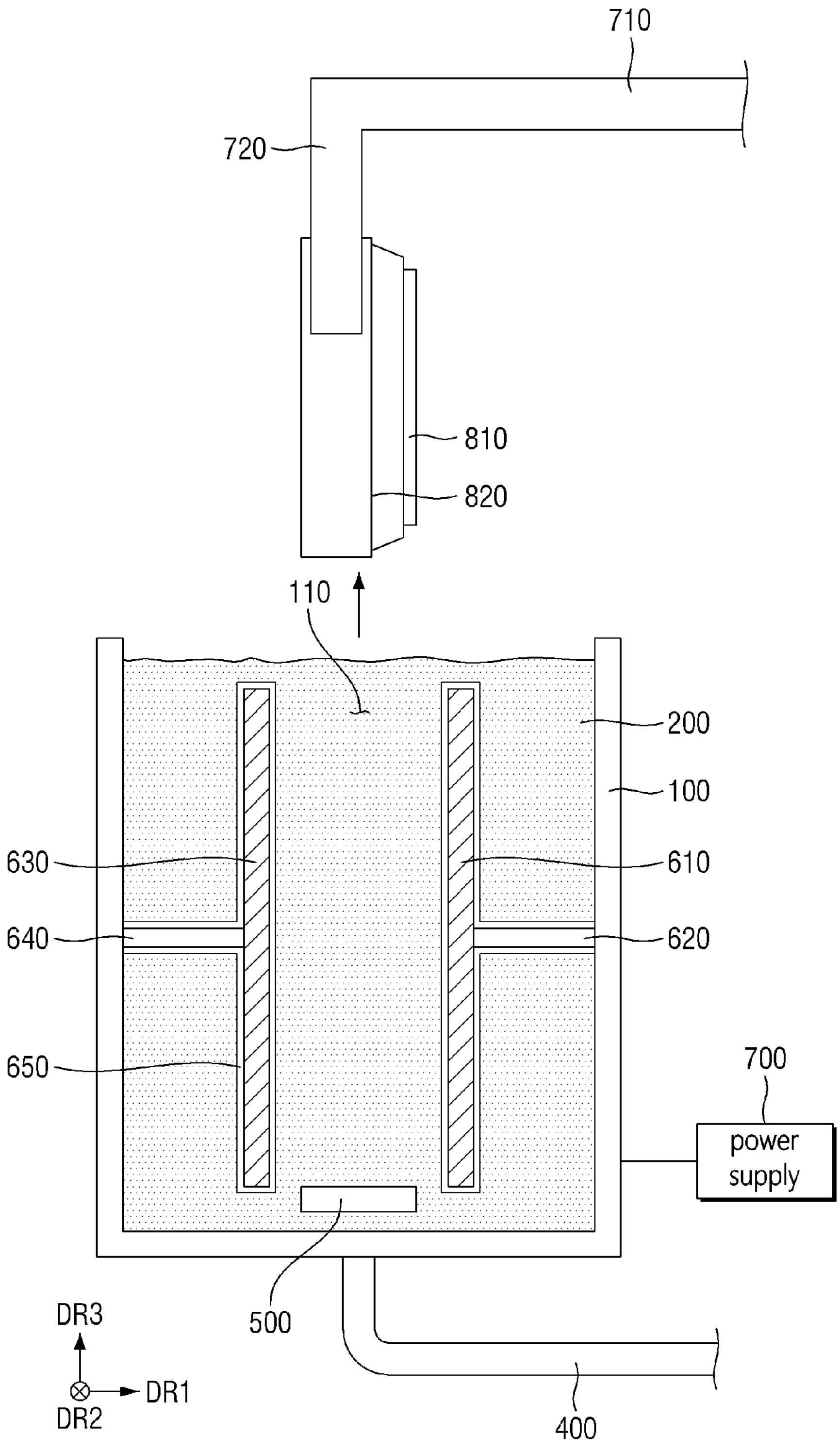

Referring to FIGS. 10 and 11, the step of taking the mask 810 out of the cleaning bath 100 may include a step in which the robot hand 720 takes the mask 810 and the frame 820 out of the cleaning bath 100. For example, the robot hand 720 may move to an upper portion of the cleaning bath 100 and move in an opposite direction of the third direction. In case that the robot hand 720 and the frame 820 are in contact with each other, the robot hand 720 may be coupled to the frame 820. After the robot hand 720 is coupled to the frame 820, the robot arm may move in the third direction to move the frame 820 and the mask 810 coupled to the frame 820 in the third direction. The corresponding process may be performed in the reverse order of the step of inserting the mask 810 into the cleaning bath 100 shown in FIG. 7. In the process of coupling the robot hand 720 with the frame 820, the robot hands 720 may grip the frame 820 by applying a pressure to the frame 820, or a jig included in the robot hand 720 may be coupled with the frame 820, and various coupling schemes may be used.

The step of turning off the heating coil may include a step in which the power supply 700 stops supplying the power supplied to the induction heating device 600 or cuts off the power supplied to the induction heating device 600 using a separate switch or the like.

Figure 12:
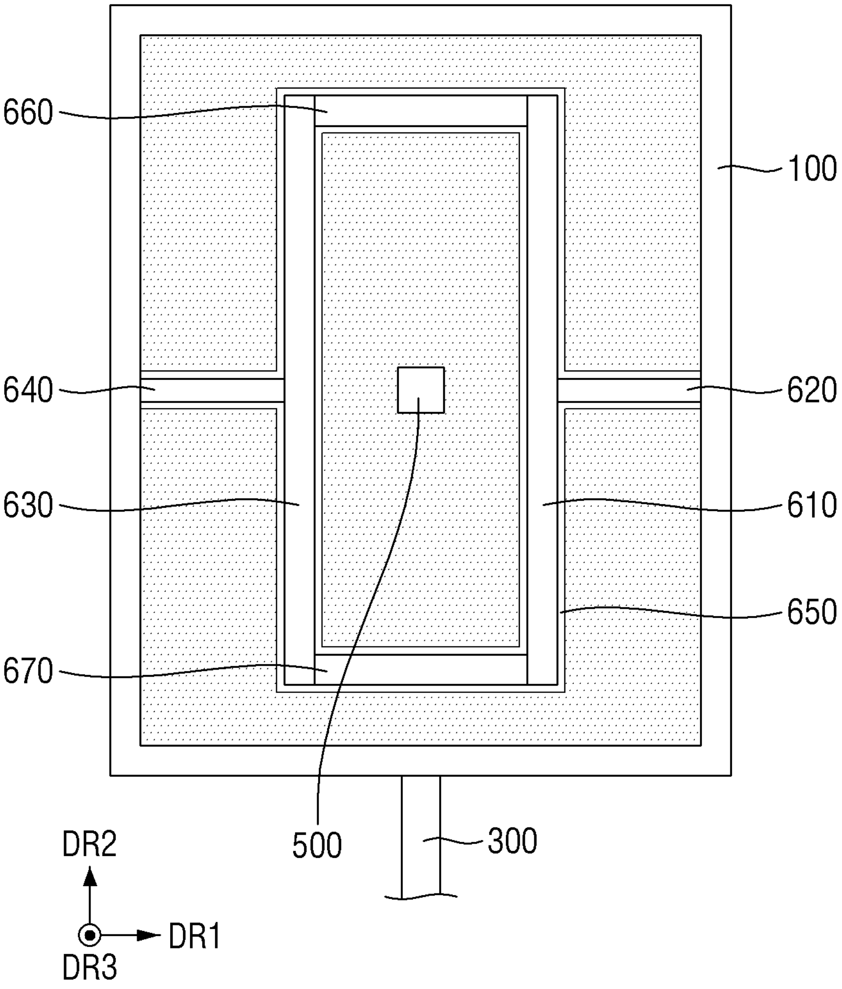
FIG. 12 is a plan view illustrating a mask cleaning apparatus according to another embodiment.

FIG. 12 is a plan view illustrating a mask cleaning apparatus according to another embodiment.

The mask cleaning apparatus 10 according to the embodiment is different from the embodiment of FIG. 2 in the number and arrangement of heating coils included in the induction heating device 600.

Referring to FIG. 12, the induction heating device 600 may include a first heating coil 610, a second heating coil 630, a third heating coil 660, and a fourth heating coil 670. The first heating coil 610, the second heating coil 630, the third heating coil 660, and the fourth heating coil 670 may be configured to generate heat in the induction heating device 600. The first heating coil 610 may be disposed to be parallel with the first side of the cleaning bath 100, the second heating coil 630 may be disposed to be parallel with the third side of the cleaning bath 100, the third heating coil 660 may be disposed to be parallel with the second side of the cleaning bath 100, and the fourth heating coil 670 may be disposed to be parallel with the fourth side of the cleaning bath 100.

The first support 620 may connect the first side with the first heating coil 610 to fix the first heating coil 610 inside the cleaning bath 100. The second support 640 may connect the third side with the second heating coil 630 to fix the second heating coil 630 inside the cleaning bath 100. The third heating coil 660 may be coupled to a side of the first heating coil 610 in the second direction and a side of the second heating coil 630 in the second direction, and the fourth heating coil 670 may be coupled to a side of the first heating coil 610 in the opposite direction of the second direction and a side of the second heating coil 630 in the opposite direction of the second direction, but they are not limited thereto. For example, the first heating coil 610, the second heating coil 630, the third heating coil 660 and the fourth heating coil 670 may be integral with each other. In another embodiment, the third heating coil 660 and the fourth heating coil 670 may be disposed, and the first heating coil 610 and the second heating coil 630 may be disposed to be coupled to the sides of the third heating coil 660 and the fourth heating coil 670.

The first heating coil 610 and the second heating coil 630 may be disposed in parallel, and the third heating coil 660 and the fourth heating coil 670 may be disposed in parallel. Therefore, in the cleaning process of the mask 810, heat may be effectively applied to the mask 810 and the frame 820, which are disposed among the first heating coil 610, the second heating coil 630, the third heating coil 660, and the fourth heating coil 670.

The power supply 700 may supply the power to all of the first heating coil 610, the second heating coil 630, the third heating coil 660, and the fourth heating coil 670.

The mask cleaning apparatus 10 according to the embodiment may surround the mask 810 and the frame 820 from four surfaces and simultaneously heat the mask 810 and the frame 820 with the four surfaces. Therefore, the mask 810 and the frame 820 may be quickly heated to reach a predetermined (or selectable) temperature in a short time, whereby the cleaning time may be shortened. For example, the cleaning time of the mask 810 may be shortened by providing four heating coils.

Figure 13:
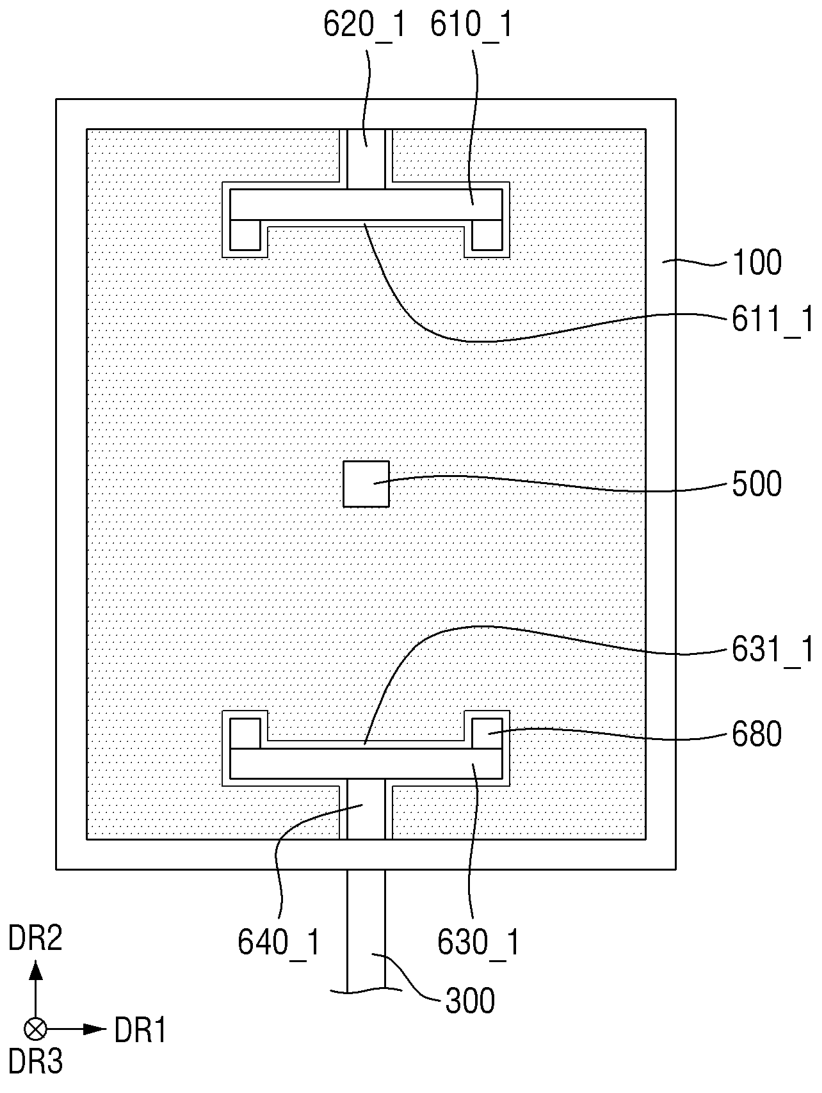
FIG. 13 is a plan view illustrating a mask cleaning apparatus according to still another embodiment.

FIG. 13 is a plan view illustrating a mask cleaning apparatus according to still another embodiment.

The mask cleaning apparatus 10 according to the embodiment is different from the embodiment of FIG. 2 in the arrangement of the heating coil included in the induction heating device 600.

Referring to FIG. 13, a first heating coil 610_1 may be disposed to be parallel with the second side of the cleaning bath 100, and a second heating coil 630_1 may be disposed to be parallel with the fourth side of the cleaning bath 100. One surface 611_1 of the first heating coil 610_1 and one surface 631_1 of the second heating coil 630_1 may be disposed to face each other. Multiple coupling members 680 may be disposed on one surface 611_1 of the first heating coil 610_1 and one surface 631_1 of the second heating coil 630_1. The coupling member 680 may be coupled to the frame 820 in the cleaning process of the mask 810. For example, the coupling member 680 may be coupled to the frame 820 to stably fix the frame 820 and the mask 810 in the cleaning bath 100 during the cleaning process. Therefore, even in case that the cleaning solution 200 in the cleaning bath 100 is jiggled by external impact, the frame 820 may be coupled to the coupling member 680 and stably fixed, whereby influence of the external impact may be reduced.

The first heating coil 610_1 and the second heating coil 630_1 may heat sides of the mask 810 and the frame 820. Therefore, heat may be more effectively applied to a connection portion and a welding portion between the mask 810 and the frame 820, whereby the connection portion and the welding portion between the mask 810 and the frame 820 may be efficiently cleaned.

Figure 14:
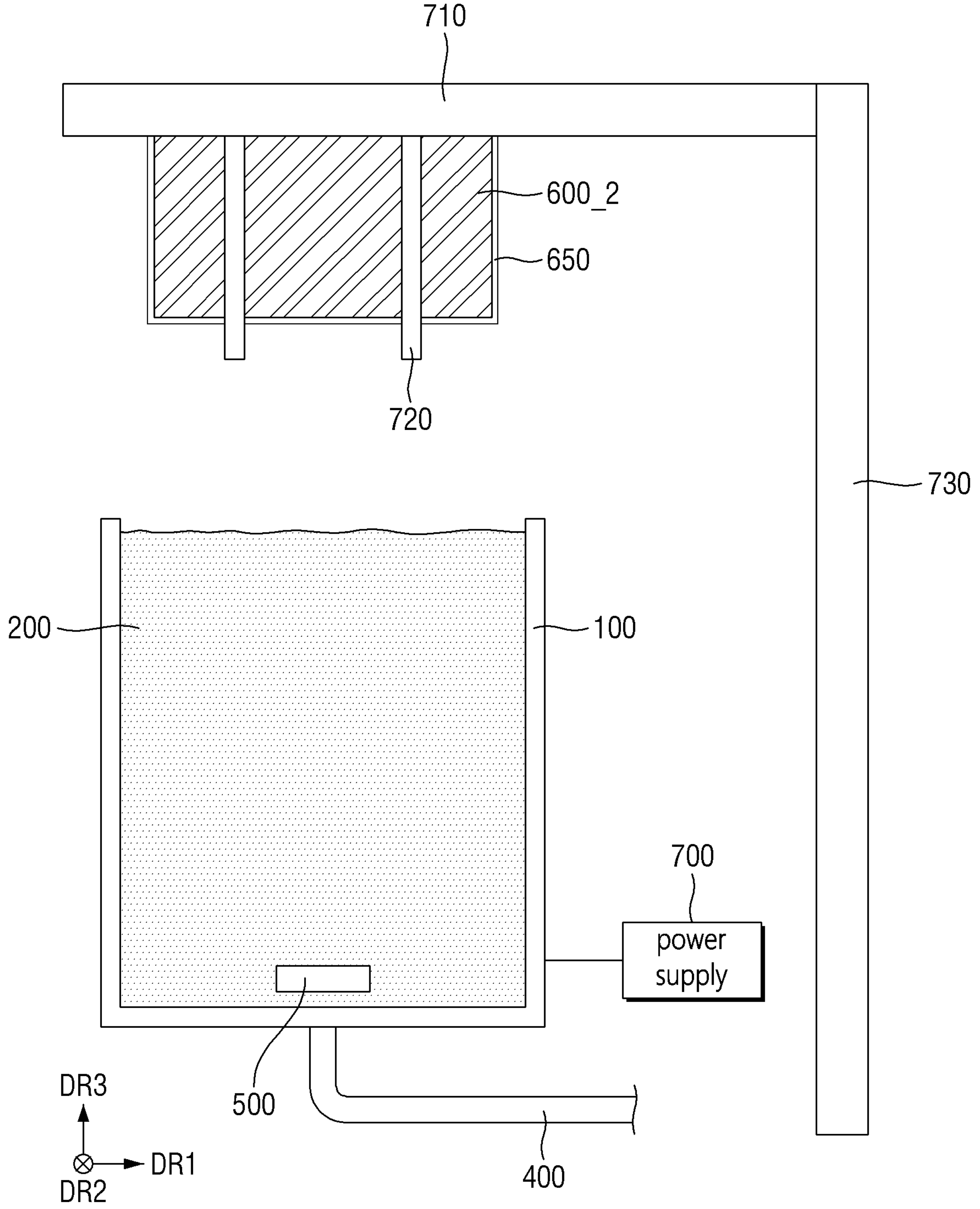
FIG. 14 is a schematic cross-sectional view illustrating a mask cleaning apparatus according to further still another embodiment.

FIG. 14 is a schematic cross-sectional view illustrating a mask cleaning apparatus according to further still another embodiment.

The mask cleaning apparatus 10 according to the embodiment is different from the embodiment of FIG. 3 in arrangement of an induction heating device 600_2.

Referring to FIG. 14, the mask cleaning apparatus 10 may include a cleaning bath 100, a supply pipe (not shown), a discharge pipe 400, and a transfer robot. The transfer robot may include a robot body 730, a robot hand 720, and a robot arm 710. The robot body 730 may be fixed so that the transfer robot may be stably disposed, and the robot arm 710 may be coupled to the robot body 730 to move in the third direction and a direction opposite to the third direction. The robot hand 720 may serve to grip the mask 810.

The induction heating device 600_2 may be disposed in the same direction as the direction in which the robot hand 720 is coupled to the robot arm 710. Therefore, the induction heating device 600_2 may apply heat to a target gripped by the robot hand 720. Therefore, during the cleaning process of the mask 810, the induction heating device 600_2 may apply heat to the mask 810 gripped by the robot hand 720 when the robot hand 720 grips and transfers the mask 810. Therefore, while the mask 810 is being transferred during the cleaning process of the mask 810, the mask 810 may be heated by the induction heating device 600_2, whereby the overall cleaning time of the mask 810 may be shortened. In other words, after the mask 810 is seated inside the cleaning bath 100, in case that heat is applied to the mask 810 by a separate device, a separate standby time may be required until the mask 810 reaches a set temperature, whereas the mask 810 may be cleaned without a separate standby time in case that the mask is heated by the induction heating device 600_2 coupled to the robot hand 720 during the transfer time of the mask 810, whereby the overall cleaning time may be shortened to increase efficiency.

Figure 15:
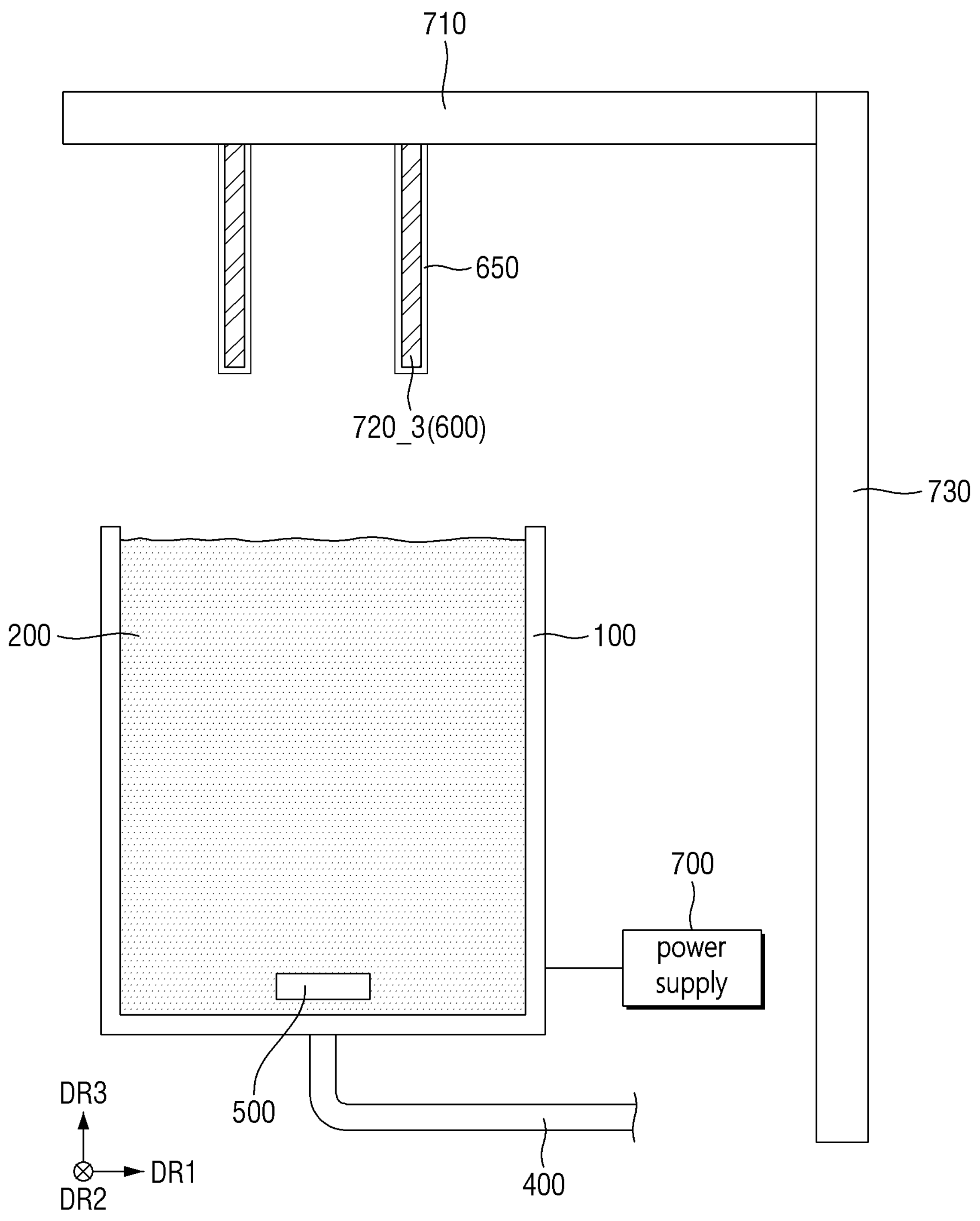
FIG. 15 is a schematic cross-sectional view illustrating a mask cleaning apparatus according to another embodiment.

FIG. 15 is a schematic cross-sectional view of a mask cleaning apparatus according to another embodiment.

The mask cleaning apparatus 10 according to the embodiment is different from the embodiment of FIG. 14 in that a robot hand 720_3 and the induction heating device 600 are not provided as separate components, and the robot hand 720_3 includes the induction heating device 600.

Referring to FIG. 15, the robot hand 720_3 may include the induction heating device 600. Therefore, the robot hand 720_3 may serve to grip a target and heat the target together. For example, the robot hand 720_3 may be coupled to the frame 820. The robot hand 720_3 may grip the frame 820 by applying a pressure to the frame 820, and a jig included in the robot hand 720_3 may be coupled to the frame 820. Various coupling schemes may be used. Also, the robot hand 720_3 may include the induction heating device 600 therein. A shortest distance between the robot arm 710 and the induction heating device 600 and a shortest distance between the robot arm 710 and the robot hand 720_3 may be same. Therefore, the power may be applied to the induction heating device 600 included in the robot hand 720_3, so that heat may be applied to the mask 810 and the frame 820 coupled to the robot hand 720_3.

The robot hand 720_3 may include the induction heating device 600, so that the robot hand 720_3 may be coupled to the frame 820 even without the induction heating device 600 as a separate component and may serve to apply heat to the frame 820 and the mask 810. Therefore, since the robot arm 710 has only to be coupled to the robot hand 720_3 including the induction heating device 600, space utilization may be efficiently made.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments.

What is claimed is:

1. A mask cleaning apparatus comprising:
- a cleaning bath including an accommodating space in which a cleaning solution is stored;
- a transfer robot transferring a mask; and
- an induction heating member disposed inside the accommodating space, wherein
- the cleaning bath includes at least one side and a bottom surface, which define the accommodating space, and
- the induction heating member includes:
  - a first heating member;
  - a second heating member; and
  - a waterproof layer covering the first heating member and the second heating member.

2. The mask cleaning apparatus of claim 1, wherein a surface of the first heating member and a surface of the second heating member face each other.

3. The mask cleaning apparatus of claim 2, wherein
- the at least one side of the cleaning bath include:
  - a first side extending in a first direction; and
  - a second side extending in a second direction intersecting the first direction in plan view, and
- a length of the first side is longer than a length of the second side in plan view.

4. The mask cleaning apparatus of claim 3, wherein each of the surface of the first heating member and the surface of the second heating member extends in the first direction in plan view.

5. The mask cleaning apparatus of claim 4, wherein the induction heating member further includes a third heating member and a fourth heating member, and each of a surface of the third heating member and a surface of the fourth heating member extends in the second direction.

6. The mask cleaning apparatus of claim 3, wherein each of the surface of the first heating member and the surface of the second heating member extends in the second direction in plan view.

7. The mask cleaning apparatus of claim 6, further comprising:

a coupling member disposed on the surface of the first heating member and the surface of the second heating member.

8. The mask cleaning apparatus of claim 2, wherein the first heating member and the second heating member are spaced apart from the bottom surface of the cleaning bath.

9. The mask cleaning apparatus of claim 1, wherein each of the first heating member and the second heating member generates heat by an induced current flowing in a resistor inside each of the first heating member and the second heating member.

10. The mask cleaning apparatus of claim 1, further comprising:

an ultrasonic wave generator disposed inside the cleaning bath, wherein the ultrasonic wave generator generates ultrasonic waves.

11. The mask cleaning apparatus of claim 10, wherein the ultrasonic wave generator is disposed between the first heating member and the second heating member in plan view.

12. The mask cleaning apparatus of claim 11, wherein the ultrasonic wave generator is disposed at a center of the cleaning bath in plan view.

13. The mask cleaning apparatus of claim 1, wherein the transfer robot includes a robot hand, and the robot hand is coupled with the mask to transfer the mask to the accommodating space of the cleaning bath, or transfer the mask from the accommodating space to outside of the cleaning bath.

14. The mask cleaning apparatus of claim 1, wherein the induction heating member is supplied with power to apply heat to the mask disposed in the accommodating space of the cleaning bath.

15. A mask cleaning apparatus comprising:

a cleaning bath including an accommodating space in which a cleaning solution is stored;

an ultrasonic wave generator disposed inside the cleaning bath and generating ultrasonic waves; and a transfer robot including an induction heating member, wherein the transfer robot transfers a mask to the accommodating space of the cleaning bath, or transfers the mask from the accommodating space to outside of the cleaning bath.

16. The mask cleaning apparatus of claim 15, wherein the transfer robot further includes:

a robot arm to which the induction heating member is coupled; and a robot hand coupled to the mask during a transfer process.

17. The mask cleaning apparatus of claim 16, wherein the induction heating member and the robot hand are disposed on a same side of the robot arm.

18. The mask cleaning apparatus of claim 17, wherein a shortest distance between the robot arm and the induction heating member and a shortest distance between the robot arm and the robot hand are same.

19. The mask cleaning apparatus of claim 15, wherein the induction heating member is coupled to the mask to directly grip the mask during a transfer process.

20. The mask cleaning apparatus of claim 19, wherein the induction heating member includes a first heating member and a second heating member, and the mask is disposed between the first heating member and the second heating member during the transfer process of the mask.

* * * * *